UNITED STATES PATENT OFFICE.

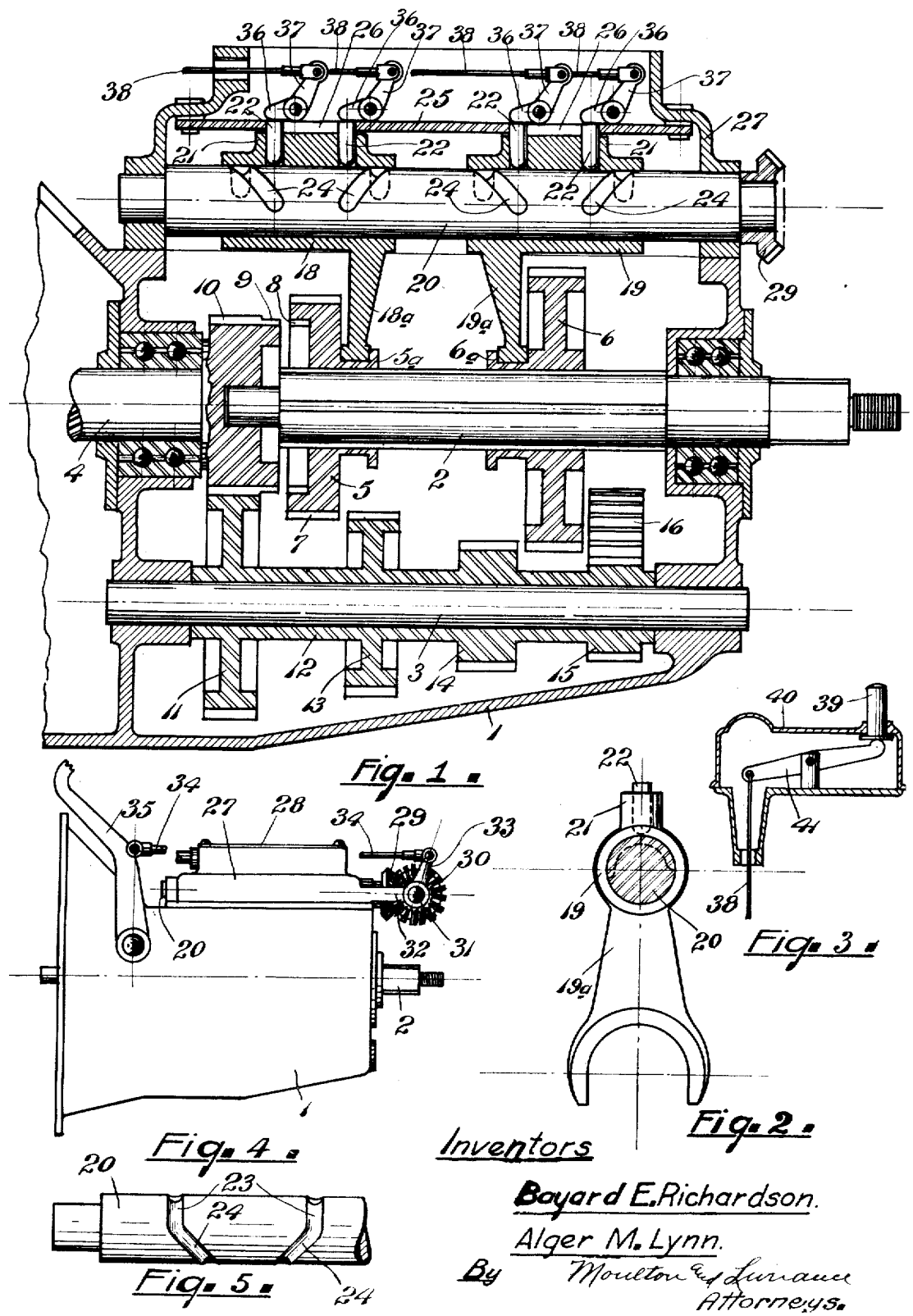

BAYARD E. RICHARDSON AND ALGER M. LYNN, OF GRAND RAPIDS, MICHIGAN.

GEAR-SHIFTING MECHANISM.

1,283,561. Specification of Letters Patent. Patented Nov. 5, 1918.

Application filed September 7, 1917. Serial No. 190,210.

*To all whom it may concern:*

Be it known that we, BAYARD E. RICHARDSON and ALGER M. LYNN, citizens of the United States of America, residing at Grand Rapids, in the county of Kent and State of Michigan, have invented certain new and useful Improvements in Gear-Shifting Mechanism; and we do hereby declare the following to be a full, clear, and exact description of the invention, such as will enable others skilled in the art to which it appertains to make and use the same.

This invention relates to a mechanism designed for the shifting of sliding gears in a sliding gear transmission, and particularly adapted for use with motor vehicles in which a clutch is interposed between the motive power for the vehicle and the mechanism driven thereby. It is an object and purpose of the present invention to provide a gear shifting mechanism in which any desired shift of gears may be selected for operation through the manual actuation of a number of selective devices, one of which is associated with each gear shift to be secured, while the actual shifting of the gears is effected by return movement of the clutch and the pedal connected thereto following its operation to disconnect the motive power from the driven mechanism. A further object and purpose of the invention contemplates the construction of a gear shifting mechanism of this character in the simplest and most economical manner, making use of relatively few parts of simple design with a total elimination of springs from the mechanism other than that which actuates the clutch to hold it in operative connecting position.

For an understanding of the invention, reference may be had to the accompanying drawing showing a preferred embodiment thereof, in which—

Figure 1 is a vertical longitudinal section through a sliding gear transmission equipped with our invention.

Fig. 2 is a partial sectional and side elevation showing one of the slidable shifting members associated with the sliding gears of the transmission.

Fig. 3 is a partial sectional and side elevation of the manually operative parts of the selective mechanism.

Fig. 4 is a side elevation with parts broken away, of a transmission mechanism inclosed within a housing, the invention being applied thereto, and the connection of the clutch pedal therewith for operation of the same indicated, and Fig. 5 is a partial plan view of a rotatably mounted shaft which is utilized in moving the sliding gears.

Like reference characters refer to like parts in the various views of the drawings.

The transmission mechanism is housed within a suitable casing 1 which, preferably, is located back of and connected to the engine of the motor vehicle. In the construction of the transmission mechanism a horizontal shaft 2 is used, paralleling which is a second counter or jack shaft 3, the shaft 2 being in alinement with a shaft 4 in front thereof and having gears 5 and 6 splined thereon, the former of which has a series of gear teeth 7 cut around its outer surface, being also provided with a series of annular gear teeth 8 in the front face thereof which are adapted to mesh, in one position of the gear 5, with gear teeth 9 cut around a circular member fixed to or formed integral with the rear end of the shaft 4. This member is also provided with other teeth 10 around its outer surface which are always in mesh with the teeth of a gear 11 secured to or formed integral with a sleeve 12 mounted upon the shaft 3. In addition to the gear 11, three other gears, 13, 14, and 15 are formed on the shaft 12, it being apparent that member 5 in the two positions to which it may be shifted may either connect directly with the shaft 4 or its teeth 7 may mesh with the teeth of the gear 13; while, likewise, the teeth of gear 6 may mesh either with those of gear 14 or with those of an idle pinion 16 which is in mesh with the gear 15, in which latter contingency the reverse movement of the driven mechanism with respect to the engine is secured. The mechanism described is that of a regular three speeds forward and one reverse sliding gear transmission and it is to this mechanism that our invention is shown applied, though it is to be understood that the same is applicable to other sliding gear transmissions involving greater or less numbers of speed changes.

Gears 5 and 6 are formed with integral collars 5ª and 6ª with which yokes depending from two arms 18ª and 19ª engage, said arms being cast integral with two sleeves 18 and 19 loosely mounted upon a shaft 20 which is rotatably mounted directly above the shaft 2. Both sleeves 18 and 19 at their upper sides have lugs 21 projecting therefrom in which, at two spaced apart points, vertical openings are drilled loosely receiving two pins 22 having rounded lower ends. Four grooves of concaved formation and of a size to freely receive the rounded lower ends of pin 22 are cut in . side of the shaft 20, each having a branch 23 which extends for a distance around the shaft in a plane perpendicular to the axis thereof, joining with which is a branch 24 which passes for a distance around the shaft at an angle to the branch 23 with which it is associated. Referring to Fig. 1 of the drawing it will be noted that the grooves of each pair are normally covered by one of the sleeves 18 or 19 and that the branches 24 thereof extend toward each other, the ends thereof being so positioned with respect to each other that when the gears are in neutral position, as shown in Fig. 1, and the shaft is turned substantially through an arc of ninety degrees, all of the pins drop by gravity into the ends of the diagonal grooves 24.

Directly above the projections 21 a plate 25 is located having two slots 26 cut therein into which the upper ends of the pins project, the pins of each pair being at opposite ends of a slot 26 when the gears are in neutral position so that any attempted shifting of the gears when the pins are elevated, that is, with the clutch engaged as shown in Fig. 1, is impossible. The plate 25 and the shaft 20 are suitably mounted on a covering housing 27 which is secured above the main casing 1. In practice the open upper end of this housing may be closed by a removable plate 28.

A bevel gear 29 is secured at one end of the shaft 20 and is in mesh with a bevel gear 30 fastened to a shaft 31, which is rotatably mounted in suitable bearings formed on supporting arms 32, cast integral with the member 27 as shown in Fig. 4. An arm 33 is fixed to shaft 31, projecting upwardly therefrom, to which at its upper end the rear end of a connecting rod 34 is pivotally connected, the front end thereof having pivotal connection to the clutch pedal 35, forward movement of which to its extreme forward position, it will be noted, not only serves to disconnect the engine from the transmission mechanism, but at the same time turns shaft 20 so as to bring the ends of slots 24 in proper position for the pins 22 to drop therein.

On the upper end of each pin 22 the forwardly extending arm 36 of a bell crank lever rests, four of said levers being used, and each lever includes an upwardly extending arm 37 with which a wire 38 is connected, all the wires passing outwardly at the front through an opening in the housing member 27. When the pins 22 have dropped into the slots 24, any one of the bell crank levers may be actuated to hold the pin associated therewith in its groove 24 while the shaft 20 is rotating with the return of the clutch to its normal driving position. To this end, at any convenient point for access by the hand of the operator, a plurality of push buttons 39 are mounted, preferably extending through the upper side of a housing 40 in which levers 41 are pivotally mounted between their ends, one end of each lever being engaged by a push button 39, while at the other end a wire 38 is connected, it being evident that on depression of a button, a pull is imparted to the connected wire 38 for operation of its associated bell crank lever. There are four of these push buttons, as will be understood, one for each bell crank lever. By holding a pin down in the groove 24, as soon as the clutch pedal starts to return to its normal position under influence of the clutch spring, the reverse rotation of the shaft 20 causes the lower end of the pin to ride in the groove 24 in which it is located, thereby carrying the depressed pin underneath the plate 25 and moving the sleeve 18 or 19 with which said pin is associated and its connected depending arm, either 18ª or 19ª, to one side of its neutral position thereby carrying the gear, either 5 or 6, connected to the arm moved to position to engage with the various gears 9, 13, 14, or 16 dependent upon which pin is held depressed, as will be obvious. At the same time the other pins not held in their respective grooves may lift due to the rounded lower ends thereof and the concaved formation of the grooves. It will be noted in this connection that the shifting of the gear occurs during the initial part of the lateral movement of the clutch pedal, and that during the final movement of the clutch pedal to operative position, the end of the pin depressed traverses the arm 23 of the groove into which it is held, the shifting of the gear to position taking place before the clutch connection between the engine and transmission is effected. Likewise when a gear is once shifted to driving position the clutch may be disconnected and returned to driving position at any time without affecting the change speed gearing, such rotation of shaft 20 as occurs merely carrying the branch 23 of the groove back and forth over the end of the pin, the neutralization of the gears occurring only on complete forward thrust of the clutch pedal.

From the foregoing it will be clear that we have provided a very simple and effective mechanism for the accomplishment of sliding gear shifts, and one in which the mechanism is of positive character depending in no respect upon the force of springs or that of electro-magnets which are more or less yielding and not positive in their action. The shifting of the gears from one speed to another, from neutral to any desired speed or from any speed to neutral, is effected with great readiness, it being necessary merely in the latter case to thrust the clutch pedal forward its full stroke, while in the other two cases it is necessary merely to thrust the clutch pedal forward to its full stroke, depress the button 39 associated with the particular shift desired and then let the clutch pedal return to its normal working position.

Various slight changes in constructive detail may be resorted to without departing from our invention and we, accordingly, do not wish to be limited to the exact and precise construction outlined other than as necessitated by the terms of the claims defining the invention.

We claim:

1. In a gear shifting mechanism, the combination of a plurality of gears, a shaft with which the gears are operatively associated, means to selectively connect the gears to the shaft whereby on rotation of the shaft any connected gear is moved in a direction parallel to the length of the shaft, and means to turn the shaft, substantially as and for the purpose described.

2. In a gear shifting mechanism, the combination of a plurality of gears, a shaft with which the gears are operatively associated, means to selectively connect the gears to the shaft whereby on rotation of the shaft any connected gear is moved in a direction parallel to the length of the shaft, a pedal, and means to rotate the shaft on operation of said pedal.

3. In a gear shifting mechanism, the combination of a plurality of gears, a rotatably mounted shaft, means loosely mounted on the shaft and connected to the gear, individual selective mechanisms, two for each gear for making either of two independent connections between each gear and the shaft, means whereby on rotation of said shaft, any connected gear is moved lengthwise of the shaft, the movements of any gear with respect to the shaft being in opposite directions in the two connections of the gear to the shaft, and means for rotating said shaft.

4. In a gear shifting mechanism, a rotatably mounted shaft, a gear, means loosely mounted on the shaft and connected to the gear, means for making either of two independent connections between said gear and shaft whereby the gear may be moved in either of two opposite directions parallel to the length of the shaft, said movement being effected by rotation of the shaft, and means to rotate said shaft.

5. In a gear shifting mechanism, a gear shiftable in two directions, a rotating device mounted parallel to the direction of movement of the gear for shifting said gear, and means to make either of two connections between said gear and device for moving the gear in either of two directions on rotation of said device.

6. In a gear shifting mechanism, a plurality of gears shiftable in two directions, a rotatably mounted shaft located with its axis parallel to the direction of movement of the gears, means for imparting rotative movement to the shaft alternately in two directions, and means to make either of two connections between any of the gears and the shaft for moving any of the gears in either of two directions.

7. In a gear shifting mechanism, a plurality of gears shiftable in two directions, a rotatably mounted shaft, a pedal, means for rotating the shaft in two directions with forward and return movements of the pedal, and means to make either of two connections between any of the gears and the shaft for moving any of the gears in either of two directions on return movement of the pedal and for moving the connected gear to central position between its extreme positions in the two directions of its movement on forward movement of said pedal.

8. In a gear shifting mechanism, the combination of a gear shiftable in two directions, a shaft rotatably mounted adjacent the gear and provided with two grooves in a side thereof having portions angularly disposed in opposite directions to the axis of the shaft, means to impart rotative movement to the shaft alternately in opposite directions, means loosely mounted on the shaft and connected to the gear, two pins loosely mounted on said means adapted in one position of the shaft to enter the grooves, and means for holding either of said pins in its groove whereby on movement of the shaft away from said position, the said second mentioned means and connected gear will move lengthwise of the shaft.

9. In a gear shifting mechanism, a construction containing the elements in combination claimed in claim 8, in which the two grooves in said shaft each comprise two branches, one branch lying in a plane perpendicular to the axis of the shaft, and the other in a plane located at an acute angle to the axis of the shaft, said last branches of the two grooves approaching each other at their ends, substantially as and for the purpose described.

In testimony whereof we affix our signatures.

BAYARD E. RICHARDSON.
ALGER M. LYNN.